United States Patent Office

2,981,727
Patented Apr. 25, 1961

2,981,727

PRODUCTION OF MODIFIED POLYMERS BY HEATING TO 600–900° F. IN THE PRESENCE OF CHROMIUM OXIDE

Paul J. Boeke and John N. Scott, Jr., Bartlesville, Okla., assignors to Phillips Petroleum Company, a corporation of Delaware No Drawing. Filed June 26, 1958, Ser. No. 744,681

6 Claims. (Cl. 260—93.7)

This invention relates to the production of modified polymers. In one aspect, it relates to a process for catalytically treating polymers so as to lower the flex temperature and decrease the stiffness of the polymers.

Numerous methods are described in the literature for producing normally solid and semisolid polymers. For example, hydrocarbons such as ethylene, propylene, isobutene, butadiene and styrene can be polymerized, either alone or in various admixtures with one another, to produce semisolid or solid polymers. Recently, considerable attention has been directed to the production of solid polymers of ethylene and/or propylene. The polymerizations are frequently carried out at low pressure in the presence of solid catalysts, and high molecular weight polymers, such as polyethylenes, have been produced, which have properties superior to those of low density, low crystallinity polymers prepared by previously known methods. These polymers differ from the latter polymers, which can be produced by high pressure processes, particularly as regards their high density and crystallinity, and they are especially useful where high stiffness and high tensile strength are desired. However, there are many applications where it is very desirable to have a polymer which possesses a greater flexibility than the rigid polymers usually obtained by the new low pressure processes.

It is an object of this invention, therefore, to provide a process for modifying the properties of a high density, high crystallinity polymer.

Another object of the invention is to provide a process for lowering the flex temperature and decreasing the stiffness of high density, highly crystalline polymers.

Other and further objects and advantages of the invention will become apparent to those skilled in the art upon consideration of the accompanying disclosure.

The instant invention is concerned with a process for catalytically treating high density, highly crystalline polymers so as to lower the flex temperature and decrease the stiffness of the polymers. For example, it has been found that by proceeding in accordance with the process of this invention, a high density, highly crystalline polymer of ethylene having a flex temperature of 20° F. and below can be produced from a polymer having a flex temperature above 50° F. Furthermore, the stiffness of the polymer is also appreciably decreased by the treatment. Broadly speaking, the process comprises contacting a high density, highly crystalline polymer with a catalyst comprising chromium oxide, at least part of the chromium being in the hexavalent state, associated with at least one oxide selected from the group consisting of silica and alumina, the contacting occurring at a temperature in the range of 600 to 900° F. for a period of time of from 0.5 to 5 minutes.

The modified polymers produced by the process of this invention exhibit a lower flex temperature and decreased stiffness as compared to the starting material. It is noted that the other properties of the modified polymer are not materially affected by the treatment. In particular, the melt index of the modified polymer is approximately the same as the melt index of the polymeric starting material, indicating that the molecular weight of the polymer is substantially unchanged in the process. The reason for the unexpected change in the flex temperature and stiffness of the polymer is not completely understood. It is believed that isomerization occurs during the catalytic treatment, resulting in an alteration of the molecular structure of the polymer. This alteration in molecular structure appears to be due to changes in internal unsaturation of the polymer and also to branching. However, since the molecular weight of the polymer remains substantially unchanged, it is unlikely that branching occurs to any great extent.

The polymers which are treated in accordance with this process having a molecular weight of at least 20,000, preferably a molecular weight in the range of 20,000 to 200,000 and more desirably in the range of 35,000 to 100,000. The polymers have a crystallinity of at least 70 percent, preferably at least 80 percent and more desirably at least 90 percent at 25° C. The crystallinity of the polymers can be determined by measurements of nuclear magnetic resonance, using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by a fall of about 1.5° C. per minute at 135° C. The ethylene polymers used have a density of at least 0.94 at 25° C., while the polymers of propylene have a density of about 0.90 at 25° C. The polymers often have an inherent viscosity of at least 0.8, preferably an inherent viscosity between 1.2 and about 10, as determined from a solution of 0.2 gram of polymer in 50 cc. of tetralin at 130° C. The softening point of the polymer will vary with the particular polymer used, increasing as the density and crystallinity of the polymer increases. Generally, the softening point is above about 250° F., preferably in the approximate range of 250 to 330° F., and is several degrees, e.g., about 10° F., higher than the melting point of the polymer.

Polymers having the above described properties, and which can, therefore, be advantageously used in the practice of the instant invention, can be produced according to a method described in U.S. Patent 2,825,721, issued on March 4, 1958, to J. P. Hogan and R. L. Banks. As set forth in detail in this patent, the polymers can be produced by contacting an aliphatic 1-olefin containing from 2 to 8 carbon atoms per molecule, such as ethylene or propylene, or mixtures of ethylene and other unsaturated hydrocarbons, such as mixtures of ethylene with minor amounts of monoolefins containing up to and including 6 carbon atoms per molecule, such as propylene, 1-butene and 1-pentene, with a catalyst comprising as its essential ingredient chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. A polyethylene produced in accordance with the Hogan and Banks process usually has a molecular weight in the range of 30,000 to 60,000.

Other polymers which can be advantageously used in the instant process can be produced in accordance with the process described by Leatherman et al. in copending U.S. patent application Serial No. 590,567, filed June 11, 1956. In accordance with this process, ethylene or mixtures of ethylene with other hydrocarbons containing olefinic unsaturation are contacted with a suspension of a chromium-oxide-containing catalyst at a temperature such that all of the polymer produced is insoluble in the diluent and in solid particle form, the particles being substantially non-tacky and non-agglutinative and suspended in the liquid diluent. When utilizing pentane and higher paraffinic hydrocarbons as the reaction medium in this process, the polymerization temperature is generally in the range of about 230° F. and below, preferably 225° F. and below. The temperature range for naphthenic hydrocarbons is 190° F. and below, preferably about 180° F. and below. If mixtures of paraffinic and naphthenic hydrocarbons are utilized, the upper temperature limit is between 190° F. and 230° F., depending upon the composition of the mixture. The product produced in accordance with this process is a polymer having a high molecular weight, e.g., up to 125,000 and higher.

Polymers suitable for use in the present process can also be produced by other methods, e.g., by proceeding in accordance with the process disclosed by J. A. Reid in copending U.S. patent application Serial No. 494,281, filed March 14, 1955, and by H. D. Lyons and Gene Nowlin in copending U.S. patent application Serial No. 495,054, filed March 17, 1955. As disclosed in the first of these patent applications, a solid olefin polymer, such as a polymer of ethylene, can be produced by contacting ethylene with a catalyst comprising a mixture of an organometallic compound, such as an aluminum trialkyl, and a halide of a Group IV of the periodic table, such as titanium tetrachloride. As disclosed in the latter of the foregoing patent applications, an olefin, such as ethylene, is polymerized in the presence of a catalyst comprising an organometallic halide, such as ethyl-aluminum dichloride, and a halide of a Group IV metal, such as titanium tetrachloride, so as to provide a high molecular weight olefin polymer.

As mentioned hereinbefore, the process of this invention is carried out in the presence of a chromium oxide-containing catalyst. The catalyst can be prepared by any suitable method such as by the impregnation of particulate silica, alumina or silica-alumina, for example, with a solution of chromium trioxide or a compound convertible to chromium oxide by calcining, followed by drying and activation of the composite at a temperature in the range of 450 to 1500° F., preferably 750 to 1500° F., for a period of from 3 to 10 hours or more. Activation is conducted by heating the material in a stream of gas. It is preferred that the gas contain oxygen and that it be substantially water-free. Preferably, the dew point of the activation gas is below 75° F., more desirably below 0° F. However, inert gases such as carbon dioxide and nitrogen can be used. The catalyst comprising chromium oxide can be prepared by using, as a starting material, chromium trioxide, chromic nitrate, chromic acetate, chromic chloride, chromic sulfate, ammonium chromate, ammonium dichromate, sodium dichromate, lithium chromate, or other soluble salts of chromium. Impregnation with chromium trioxide is preferred, although the chromium nitrates can be used with similar results. The amount of chromium, as chromium oxide, in the catalyst can range from 0.1 to 10 or more weight percent, and is ordinarily a minor component of the catalyst in terms of weight percent. A preferred non-chromium component or "support" is a silica-alumina composite containing a major proportion of silica and a minor proportion of alumina. Silica-alumina composites prepared by any of the prior art processes for preparing such catalytically active composites are operative for the process of this invention. Coprecipitation and impregnation are examples of such processes. One support that has been found to be particularly effective is a coprecipitated 90 percent silica-10 percent alumina support. It is necessary for some of the chromium to be in the hexavalent state, and it is preferred to use a chromium oxide catalyst component in which the amount of hexavalent chromium is at least 0.1 percent of the weight of the catalyst component comprising the chromium oxide and associated oxide or oxides. The hexavalent chromium is determined by ascertaining the water soluble chromium present by leaching with water and determining the dissolved chromium in the leachings by any suitable analytical method known in the art, e.g., by the addition of potassium iodide solution and titration of the liberated iodine with sodium thiosulfate solution.

The amount of catalyst used in treating the high density, highly crystalline polymers in accordance with this invention can vary over a rather wide range. In general, at least 0.1 weight percent of the catalyst is used, and the amount usually falls in the range of 0.1 to 5 weight percent or higher, based on the polymer to be treated. However, it is generally preferred to utilize an amount of catalyst in the range of 0.1 to 1.0 weight percent.

The process of this invention can be carried out either as a batch or as a continuous process. When operating batchwise, the polymer to be treated and the catalyst can be introduced into a suitable reaction vessel provided with a suitable heating and stirring means. The reaction vessel is then heated to a temperature in the range of 600 to 900° F., the polymer being maintained in contact with the catalyst at a temperature in this range for a period of from 0.5 to 5 minutes. It is usually desirable to carry out the process under a blanket of an inert gas, such as nitrogen, so as to exclude air from the reaction vessel. The treatment of the polymer with the catalyst should also be conducted in the absence of any substantial amount of moisture since water as well as oxygen has a deleterious effect on the catalyst. Upon completion of the reaction period, the polymer, while still out of contact with oxygen, is rapidly cooled, e.g., by means of a water quench to a temperature in the range of 250 to 400° F., after which it can be removed from the vessel and further processed as desired. In some cases, for example, where an amount of catalyst in excess of about 0.5 weight percent is employed, it is desirable to separate the catalyst from the polymer. This can be readily accomplished by dissolving the polymer in any suitable solvent, e.g., a naphthenic hydrocarbon such as cyclohexane or an aromatic such as benzene, toluene, or xylene, by heating the solvent and polymer to a temperature such that the polymer is soluble therein, e.g., to a temperature in the range of 275 to 450° F. The catalyst can then be separated from the polymer solution by any convenient method, such as filtration, centrifugation, or settling. When carrying out the process in a continuous manner, it is advantageous to employ a long tubular treating zone which is provided with a suitable heating means and an auger for moving the polymer therethrough. Prior to the introduction of the polymer into the treating zone, the catalyst can be incorporated into the polymer by milling or other suitable kneading operation. The polymer containing catalyst is thereafter introduced into one end of the tubular treating zone which is provided with an outlet at the opposite end for extrusion of the product. The temperature maintained in the treating zone can be controlled by the heating means, and the residence time therein can be controlled through the operation of the auger with which the zone is provided. The modified polymer upon removal from the tubular treating zone is in a plastic molten state and is thereafter cooled, e.g., by quenching with water. In order to prevent degradation of the polymer, it is desirable that the polymer while in a heated state be kept out of contact with oxygen. This can be accomplished by passing the treated polymer directly from the treating zone into a closed quench chamber from which oxygen is excluded. In the quench chamber, the polymer is cooled, e.g., by contact with water or other suitable coolant fluid, to a temperature between 250 and 400° F. Apparatus which can be advantageously used to carry out the process of this invention is described in copending U.S. patent application Serial No. 734,978, filed on May 13, 1958, by W. H. Whittington.

A more complete understanding of the invention can be obtained by referring to the following illustrative example, which is not intended, however, to be unduly limitative of the invention.

*Example*

Polyethylene having a high molecular weight was prepared according to the following procedure by contacting ethylene with a chromium oxide-containing catalyst. A slurry of catalyst in normal pentane was charged to a reactor provided with a mechanical stirrer. The catalyst used was prepared by impregnating a silica-alumina coprecipitated composite with an aqueous solution of chromium trioxide. The resulting composite was dried and activated by heating in dry air for about 5 hours at approximately 1175° F. The final catalyst contained approximately 2.5 weight percent chromium as chromium oxide, most of which was in the hexavalent state. Pure grade ethylene was then metered into the reactor, and after polymerization had been initiated, a slurry of solid polymer and catalyst in normal pentane was withdrawn, and additional pentane, catalyst and ethylene were added to the reactor. The polymer was recovered from the withdrawn mixture by vaporizing the pentane and finally drying the polymer in a vacuum oven. The following conditions were maintained during the polymerization:

| | |
|---|---:|
| Pressure _____p.s.i.g__ | 450 |
| Temperature _____° F__ | 210 |
| Pentane feed rate _____lbs. per hour__ | 6167 |
| Ethylene feed rate _____cubic ft./hr__ | 85 |
| Reactor catalyst conc. _____wt. percent__ | 0.169 |
| Polymer concentration in reactor _____percent__ | 20.0 |

A sample of polymer containing 0.09 weight percent chromium oxide and having a density of at least 0.94 and a crystallinity of over 90 percent, which was a composite from 12 runs carried out under the above conditions, was then treated according to the following procedure. The polymer was charged to a commercial plastics extruder comprising a tube containing a helical conveyor and provided with an electrical heater. The polymer was melted in the extruder at about 600° F. and was extruded through a tube having a length of 24 inches and an inside diameter of 3/8 inch, which was maintained at 850° F. by means of electrical heaters. The extruder was operated in such a manner that the heated tube was liquid full, and the residence time of the polymer within the tube was 3 minutes. The treated polymer was cooled, and the physical properties thereof were determined. The results of this run, labeled Run 2, are shown hereinbelow in Table I. Under Run 1 of this table, the properties of the polymer before this treatment are listed.

The same high molecular weight polymer, prepared as described above and containing 0.09 weight percent chromium oxide, was mill blended with sufficient activated chromium oxide on silica-alumina to bring the content of chromium oxide-containing material in the polymer up to 1.09 weight percent. The activated chromium oxide on silica-alumina which was used was identical to that employed in the polymerization described hereinbefore. This material containing activated catalyst was treated in the same extruder and under the same conditions as described in conjunction with Run 2. The results of the run are set forth hereinbelow in Table I under Run 3.

*Table I*

| Run No. | 1 | 2 | 3 |
|---|---:|---:|---:|
| Melt Index [1] | 0.6 | 4.4 | 5.3 |
| Specific Gravity [2] | 0.957 | 0.956 | 0.957 |
| Tensile Strength, p.s.i. [3] | 3,900 | 4,200 | 4,300 |
| Elongation, percent [4] | 50 | 34 | 31 |
| Flex Temperature, ° F. [5] | +60 | +58 | +16 |
| Stiffness, p.s.i. [6] | 150,000 | 125,000 | 108,000 |
| Izod Impact Strength, [7] ft.#s/in. notch | 16 | 17 | 13 |

[1] In run 1, determined according to ASTM D1238-52T. In runs 2 and 3, determined by same test method except that a 46.5 pound weight was used, and one cut, requiring extrustion time of 1 to 5 minutes, is taken instead of several cuts as specified in test.
[2] Determined by flotation method.
[3] Determined according to ASTM D412-51T. The samples for the test were cut from a slab by means of a Type C die.
[4] Determined according to ASTM D412-51T.
[5] Determined according to ASTM D1043-51 and recorded as the point on the apparent modulus of elasticity curve at which the apparent modulus is 135,000 p.s.i.
[6] Determined according to ASTM D747-50, using a compression molded slab 1/16" thick.
[7] Determined according to ASTM D256-54T (1/4" bar).

It is seen from an examination of the data in Table I that the flex temperature and stiffness of the polymer are appreciably lowered by proceeding in accordance with the instant invention as in Run 3. It is also noted that there is no appreciable change in the melt index values of the polymers (Runs 2 and 3), indicating that there was no substantial change in the molecular weight of the polymer. (It is noted that in Runs 2 and 3 a high load melt index test was used. A high load melt index of 5.3 corresponds approximately to a normal melt index value of 0.02.) Furthermore, the fact that the flex temperature and stiffness of the polymer were lowered while the melt index remained substantially the same indicates that isomerization occurred with no appreciable amount of cracking taking place.

The polymers which are produced by the process of this invention can, in general, be utilized in applications where plastic materials are usually employed. However, the products are particularly useful in applications where the properties of lowered flex temperature and stiffness are required. Thus, the polymers of this invention are particularly useful in preparing films, coatings, rods, pipes, and other similar molded articles.

From the foregoing, it is seen that the instant invention provides a novel process for modifying properties of high density, highly crystalline polymers. Many modifications and variations of the instant invention will be apparent to those skilled in the art upon consideration of the foregoing disclosure. Such modifications and variations are clearly believed to be within the spirit and scope of the invention.

We claim:
1. A process for treating a polymer of an aliphatic 1-olefin containing up to and including 8 carbon atoms per molecule, said polymer having a crystallinity of at least 70 percent at 25° C., which comprises contacting said polymer with from 0.1 to 5 weight percent, based on said polymer, of a catalyst comprising chromium oxide, at least part of the chromium being in the hexavalent state, and at least one oxide selected from the group consisting of silica and alumina, said contacting occurring at a temperature in the range of 600 to 900° F. for a period of time of from 0.5 to 5 minutes; and recovering the treated polymer so produced.

2. The process according to claim 1 in which said polymer is a polyethylene.

3. The process according to claim 1 in which said polymer is a polypropylene.

4. The process according to claim 1 in which said catalyst comprises chromium oxide supported on silica-alumina and contains at least 0.1 weight percent hexavalent chromium.

5. A process for treating a polymer of ethylene having a density of at least 0.94 at 25° C. and a crystallinity of at least 90 percent at 25° C. which comprises introducing into a reaction zone said polyethylene and a catalyst comprising chromium oxide, at least part of the chromium being in the hexavalent state, and at least one oxide selected from the group consisting of silica and alumina, the amount of said catalyst so introduced being in the range of 0.1 to 5 weight percent of said polymer; heating said reaction zone containing said polyethylene and said catalyst to a temperature in the range of 600 to 900° F.; maintaining said reaction zone at a temperature in said range for a period of time of from 0.5 to 5 minutes; thereafter rapidly cooling said reaction zone; and withdrawing the treated polymer from said reaction zone.

6. A continuous process for treating a polymer of ethylene having a density of at least 0.94 at 25° C. and a crystallinity of at least 90 percent at 25° C. which comprises adding to said polymer a catalyst comprising chromium oxide, at least part of the chromium being in the hexavalent state, and at least one oxide selected from the group consisting of silica and alumina, the amount of catalyst so added being in the range of 0.1 to 5 weight percent of said polymer; introducing said polymer containing said catalyst into a treating zone, said treating zone being maintained at a temperature in the range of 600 to 900° F.; withdrawing said polymer from said treating zone at a rate such that said polymer has a residence time in said treating zone of from 0.5 to 5 minutes; passing said polymer into a quench zone, said quench zone and said treating zone containing substantially no oxygen; cooling said polymer in said quench zone to a temperature in the range of 250 to 400° F.; and withdrawing said cooled polymer from said quench zone.

References Cited in the file of this patent
UNITED STATES PATENTS

| | | |
|---|---|---|
| 2,367,173 | Martin | Jan. 9, 1945 |
| 2,825,721 | Hogan et al. | Mar. 4, 1958 |
| 2,830,034 | Rundquist | Apr. 8, 1958 |